April 29, 1941.  R. H. BURGESS  2,239,670
ROTATING PARACHUTE
Filed July 11, 1938
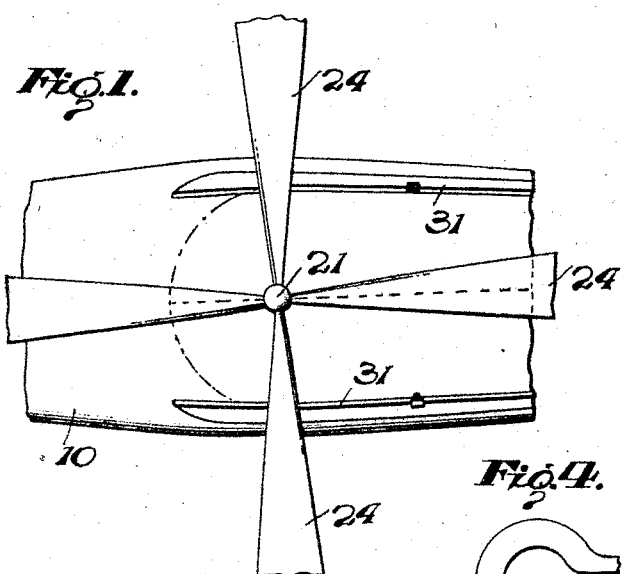
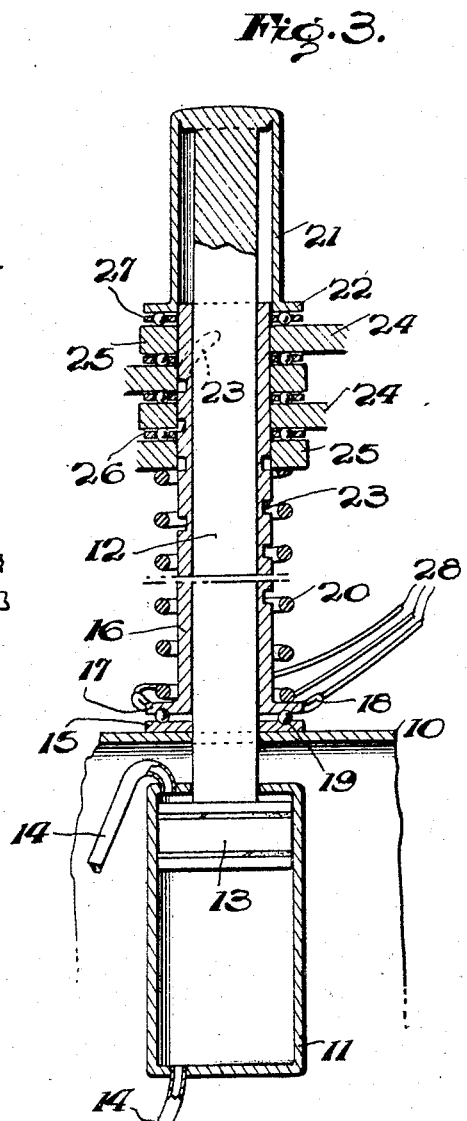
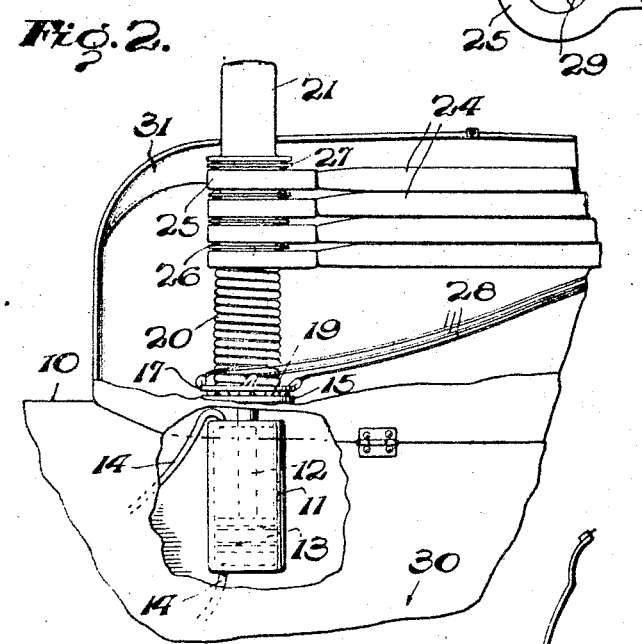
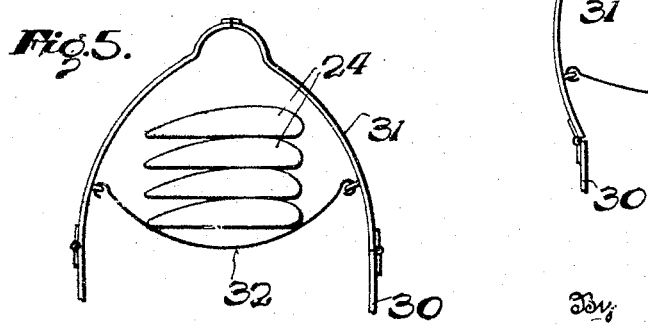
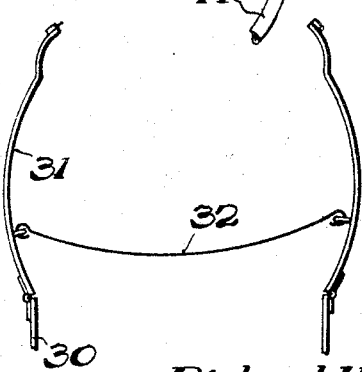
Inventor
Richard H. Burgess.
By Thos. H. Johnston
Attorney Patented Apr. 29, 1941

2,239,670

UNITED STATES PATENT OFFICE 2,239,670

ROTATING PARACHUTE

Richard H. Burgess, San Antonio, Tex.

Application July 11, 1938, Serial No. 218,595

8 Claims. (Cl. 244—139)

This invention relates to an improved rotating parachute for aeroplanes.

The salient object of the invention is to provide a mechanism whereby an aeroplane in flight may, should the aeroplane become disabled for any reason, be safely landed.

A further object of the invention is to provide a mechanism embodying a plurality of blades revoluble by air currents for checking the descent of the aeroplane, and wherein the blades may, while the aeroplane is in flight, be shifted either to active position operable for checking the descent of the aeroplane or to inactive position in stacked relation.

Another object of the invention is to provide a mechanism wherein fluid pressure operated means will be provided to control the movement of the blades to active position, and wherein said means will be operable to shift the blades to inactive position.

And the invention seeks, as a still further object, to provide a mechanism wherein a housing will be provided for enclosing the blades when in inactive position.

Other and incidental objects of the invention will appear during the course of the following description, and in the drawing:

Figure 1 is a fragmentary plan view showing the parachute mounted upon an aeroplane.

Figure 2 is a fragmentary side elevation, parts being broken away.

Figure 3 is an enlarged transverse vertical section particularly showing the mounting of the blades.

Figure 4 is a fragmentary detail plan view of one of the blade hubs.

Figure 5 is a diagrammatic view showing the blades housed.

Figure 6 is a view similar to Figure 5 but showing the housing open.

Referring now more particularly to the drawing, a portion of the fuselage of a conventional aeroplane is indicated at 10. Suitably fixed within the fuselage, as best seen in Figure 3, is a cylinder 11 and slidable through the upper end of said cylinder to project externally of the fuselage is a plunger shaft 12 to the lower end of which is fixed a piston 13 movable within the cylinder for shifting the shaft axially. Connected to the upper and lower ends of the cylinder are tubes 14 through which a suitable fluid under pressure may be introduced into the cylinder for actuating the piston in either one direction or the other, as will be well understood, the movement of the piston being under the control of the pilot of the aeroplane.

Surrounding the shaft 12 to rest upon the fuselage 10 is a bearing plate 15 and slidably receiving the shaft therethrough is a sleeve 16 rotatably fitting the shaft. This sleeve is formed at its lower end with a flange 17 on which are provided spaced ears 18 and interposed between said flange and the plate are suitable ball bearings 19 supporting the sleeve to freely turn upon the shaft.

Freely surrounding the sleeve 16 to rest at its lower end upon the flange 17 thereof is a spring 20 and appropriately fixed to the upper end of the shaft 12 is a cap 21 slidably fitting over the upper end of the sleeve and provided with a flange 22. Formed in the sleeve are external quadrantly spaced spiral slots 23 of graduated length and mounted upon the sleeve is a plurality of blades 24 having hubs 25 rotatably fitting the sleeve. Interposed between said hubs are suitable ball bearings 26 and interposed between the flange 22 of the cap 21 and the uppermost of the hubs is a like ball bearing 27. Thus, the hubs of the several blades are confined between the spring 20 and the cap. Extending between the free end portions of the blades 24 and the ears 18 are guy wires 28 or the like bracing the blades.

As seen in Figure 4, the hubs 25 of the blades 24 are provided with pins 29 which are freely received within the spiral slots 23 of the sleeve 16. Accordingly, upward movement of said hubs upon the sleeve, under the action of the spring 20, will serve to rotate the blades to active position extending in angular relation to each other, as seen in Figure 1, while downward movement of the blades upon the sleeve by the cap 21 will serve to counter-rotate the blades to inactive position in stacked relation, as shown in Figure 2 of the drawing. Thus, the pilot of the aeroplane may, at any time, by releasing the piston 13 for upward movement, permit the spring 20 to function and shift the blades upwardly to active position while, by causing the piston to be moved downwardly, the pilot may effect the downward movement of the blades to inactive stacked relation.

Mounted upon the fuselage 10, as particularly seen in Figures 5 and 6 of the drawing, is a housing 30 for the blades 24 when in inactive stacked relation. This housing includes a pair of mating doors 31 suitably hinged to the housing and extending transversely between the doors is an appropriate spring 32 urging the doors to open position. This spring is disposed for engagement by the free end portion of the lowermost of the blades 24 as the blades are shifted to inactive position so that, when the blades come to rest, as shown in Figure 5, the spring will be sufficiently flexed downwardly to close the doors over the blades. Upon the upward movement of the blades, however, the spring will be freed to urge the doors to open position so that the blades may shift, unhampered, to active position.

I claim:

1. A rotary parachute for aircraft including a plurality of blades revoluble by air currents for checking the descent of the aircraft, means operatively connecting the blades with the aircraft and supporting the blades to revolve, a connection between each of the blades and said means mounting the blades for individual movement to active position extending in angular relation to each other and to inactive position in stacked relation, and fluid pressure operated means for shifting the blades to inactive position.

2. A rotary parachute for aircraft including a plurality of blades revoluble by air currents for checking the descent of the aircraft, means operatively connecting the blades with the aircraft and supporting the blades to revolve, a connection between each of the blades and said means mounting the blades for individual movement to active position extending in angular relation to each other and to inactive position in stacked relation, means urging the blades to active position, and fluid pressure operated means for shifting the blades to inactive position.

3. A rotary parachute for aircraft including a plurality of blades revoluble by air currents for checking the descent of the aircraft, means operatively connecting the blades with the aircraft and supporting the blades to revolve, a connection between each of the blades and said means mounting the blades for individual movement to active position extending in angular relation to each other and to inactive position in stacked relation, a housing on the aircraft for enclosing the blades when in inactive position, and means operable by the blades for closing said housing.

4. A rotary parachute for aircraft including a plurality of blades revoluble by air currents for checking the descent of the aircraft, means operatively connecting the blades with the aircraft and supporting the blades to revolve, the blades being individually movable to active position extending in angular relation to each other and to inactive position in stacked relation, a housing on the aircraft for enclosing the blades when in inactive position, doors on said housing, and means urging the doors to open position, the stacked blades being engageable with the latter means for holding the doors closed.

5. A rotary parachute for aircraft including a plurality of blades revoluble by air currents for checking the descent of the aircraft, means operatively connecting the blades with the aircraft and supporting the blades to revolve, a connection between each of the blades and said means mounting the blades for individual movement to active position extending in angular relation to each other and to inactive position in stacked relation, a spring urging the blades to active position, and fluid pressure operated means for shifting the blades to inactive position and compressing said spring.

6. A rotary parachute for aircraft including a plurality of blades revoluble by air currents for checking the descent of the aircraft, means operatively connecting the blades with the aircraft and supporting the blades to revolve, the blades being individually movable to active position extending in angular relation to each other and to inactive position in stacked relation, a shaft having means thereon for shifting the blades to inactive position, a piston on said shaft, and a cylinder operatively housing said piston, the piston being operable by fluid pressure for actuating the shaft and shifting the blades to inactive position.

7. A rotary parachute for aircraft including a plurality of blades revoluble by air currents for checking the descent of the aircraft, an axially shiftable plunger shaft rigidly connected with said aircraft, a sleeve journaled thereon, hubs mounting said blades and journaled on said sleeve, the hubs supporting the blades for movement on the sleeve to active position extending in angular relation to each other and to inactive position in stacked relation, means on the plunger shaft for shifting the blades to inactive position as said shaft is axially moved, and fluid pressure operated means for shifting the shaft axially.

8. A rotary parachute for aircraft including a plurality of blades revoluble by air currents for checking the descent of the aircraft, an axially shiftable shaft rigidly connected with said aircraft, a sleeve journaled on the shaft and provided with external spiral slots, hubs journaling the blades on said sleeve and provided with pins engaging in said slots for rotating the blades individually to active position extending in angular relation to each other as the hubs are shifted upwardly on the sleeve, a spring acting on the hubs and urging the blades to active position, means carried by the shaft to act on the hubs and shift the blades downwardly on the sleeve to inactive stacked relation, and fluid pressure operated means for shifting the shaft axially downward.

RICHARD H. BURGESS.